(12) United States Patent
Schirmer et al.

(10) Patent No.: US 10,690,035 B2
(45) Date of Patent: Jun. 23, 2020

(54) DIFFUSER ASSEMBLIES AND CATALYTIC REACTORS COMPRISING THE SAME

(71) Applicant: CORMETECH, INC., Durham, NC (US)

(72) Inventors: Mark L. Schirmer, Durham, NC (US); Christian Trefzger, Durham, NC (US); Steve M. Lyons, Durham, NC (US); Colby A. Burtt, Durham, NC (US); William D. Buynitzky, Chapel Hill, NC (US); Chris E. Difrancesco, Durham, NC (US)

(73) Assignee: Cormetech, Inc., Durham, NC (US)

( * ) Notice: Subject to any disclaimer, the term of this patent is extended or adjusted under 35 U.S.C. 154(b) by 0 days.

(21) Appl. No.: 16/277,523

(22) Filed: Feb. 15, 2019

(65) Prior Publication Data
US 2019/0257233 A1    Aug. 22, 2019

Related U.S. Application Data

(60) Provisional application No. 62/631,749, filed on Feb. 17, 2018.

(51) Int. Cl.
*F01N 3/28* (2006.01)
*B01J 35/02* (2006.01)

(52) U.S. Cl.
CPC ......... *F01N 3/2892* (2013.01); *B01J 35/023* (2013.01); *F01N 3/2803* (2013.01); *B01J 2204/002* (2013.01); *F01N 2260/14* (2013.01); *F01N 2340/00* (2013.01)

(58) Field of Classification Search
None
See application file for complete search history.

(56) References Cited

U.S. PATENT DOCUMENTS

| 2005/0255605 | A1* | 11/2005 | Muzio | B01D 53/8696 436/116 |
|---|---|---|---|---|
| 2011/0194986 | A1* | 8/2011 | Cichanowicz | B01D 53/8631 422/168 |
| 2017/0036165 | A1* | 2/2017 | Schmid | B01D 53/9431 |

FOREIGN PATENT DOCUMENTS

| CN | 203598693 U | * | 5/2014 |
| JP | 09173785 A | * | 7/1997 |

OTHER PUBLICATIONS

Shimizu et al. JP09173785A-translated document (Year: 1997).*
Pan et al. CN203598693U-translated document (Year: 2014).*

\* cited by examiner

*Primary Examiner* — Walter D. Griffin
*Assistant Examiner* — Jelitza M Perez
(74) *Attorney, Agent, or Firm* — J. Clinton Wimbish; Nexsen Pruet, PLLC

(57) ABSTRACT

Briefly, in one aspect, a catalytic assembly described herein comprises a module comprising at least one layer of structural catalyst bodies having an inlet face for receiving a gas stream. A diffuser assembly is arranged a distance of greater than 50 mm from the inlet face, the diffuser assembly including at least one diffuser element comprising a plurality of apertures, wherein a ratio of aperture length (L) in the gas stream flow direction to aperture hydraulic diameter ($D_a$) is less than 1.

19 Claims, 9 Drawing Sheets

DIFFUSER ASSEMBLIES AND CATALYTIC REACTORS COMPRISING THE SAME

RELATED APPLICATION DATA

The present invention claims priority pursuant to 35 U.S.C. § 119(e) to U.S. Provisional Patent Application Ser. No. 62/631,749 filed Feb. 17, 2018 which is incorporated herein by reference in its entirety.

FIELD

The present invention relates to catalytic reactors and, in particular, to catalytic reactors employing diffuser assemblies over catalyst modules for mitigating catalyst plugging from fly ash aggregates.

BACKGROUND

Denitration or selective catalytic reduction (SCR) technologies are applied to combustion-derived flue gases for removal of nitrogen oxides. Denitration comprises reaction of nitrogen oxide species in the gases, such as nitrogen oxide (NO) or nitrogen dioxide ($NO_2$), with a nitrogen containing reductant, such as ammonia or urea, resulting in the production of diatomic nitrogen ($N_2$) and water.

Combustion flue-gases containing nitrogen oxides are commonly produced from the combustion of coal for electricity generation. Coal-fired combustion flue-gases contain high amounts of particulate matter, especially in the form of ash. This particulate matter has the ability to clog the cells of structural catalyst bodies resulting in a reduced catalytic performance and efficiency. Individual ash particles alone can plug catalyst cells or ash particles can aggregate to produce a plug. To address this problem, many utilities have modified flow control devices and honeycomb catalyst bodies to accommodate large particles in exhaust streams. For example, turning vanes and other fly ash capture apparatus have been redesigned to enhance ash capture efficiencies. Additionally, active cleaning mechanisms have been developed including soot blowers, sonic horn and pneumatic ash sweepers.

While being effective for mitigating effects of fly ash in the exhaust stream, these technologies insufficiently address the aggregation of fly ash on ductwork and beams upstream of catalyst modules in the reactor. Fly ash aggregate eventually breaks free from the ductwork and beams, striking inlet faces of catalyst bodies contained in the module. The volume of fly ash in an aggregate is substantial, often resembling an avalanche of material. Accordingly, significant catalyst plugging results.

SUMMARY

In view of these considerations, diffuser assemblies are described herein for mitigating or inhibiting catalyst plugging from fly ash aggregates. Such diffuser assemblies can disperse and/or otherwise break-up fly ash aggregates into smaller particles for passage through flow channels of structural catalyst bodies. Passage of the dispersed fly ash aggregate through the structural catalyst bodies is a fundamental departure from prior ash control apparatus where the objective is to capture the fly ash prior reaching structural catalyst bodies.

In one aspect, a catalytic assembly described herein comprises a module comprising at least one layer of structural catalyst bodies, the layer having an inlet face for receiving a gas stream. A diffuser assembly is arranged a distance of greater than 50 mm from the inlet face, the diffuser assembly including at least one diffuser element comprising a plurality of apertures, wherein a ratio of aperture length (L) in the gas stream flow direction to aperture hydraulic diameter ($D_a$) is less than 1. In some embodiments, the diffuser assembly is arranged directly over the inlet face of the catalyst layer.

In another aspect, a catalytic assembly comprises a module comprising at least one layer of structural catalyst bodies having an inlet face for receiving a gas stream. A diffuser assembly comprising vertically integrated diffuser elements is arranged over the inlet face, the diffuser elements comprising a plurality of apertures having a ratio of aperture length (L) in the gas stream flow direction to aperture hydraulic diameter ($D_a$) less than 1, wherein aperture hydraulic diameter varies between the vertically integrated diffuser elements.

In another aspect, methods of reducing plugging of structural catalyst bodies are provided. A method of reducing plugging of structural catalyst bodies in a catalytic reactor comprises providing a diffuser assembly comprising at least one diffuser element including a plurality of apertures having a ratio of aperture length (L) in the gas stream flow direction to aperture hydraulic diameter ($D_a$) less than 1. The diffuser assembly is arranged in the gas stream path at a distance of greater than 50 mm to an inlet face of a layer of structural catalyst bodies in a module. Fly ash aggregate in the gas stream striking the diffuser assembly is dispersed and/or broken into smaller particles for passage through flow channels of the structural catalyst bodies. In some embodiments, the diffuser assembly is arranged directly over the inlet face of the catalyst layer.

In a further aspect, a method of reducing plugging of structural catalyst bodies in a catalytic reactor comprises providing a diffuser assembly comprising vertically integrated diffuser elements, the diffuser elements comprising a plurality of apertures having a ratio of aperture length (L) in the gas stream flow direction to aperture hydraulic diameter ($D_a$) less than 1, wherein the aperture hydraulic diameter ($D_a$) varies between the vertically integrated diffuser elements. The diffuser assembly is arranged in the gas stream path to an inlet face of a layer of structural catalyst bodies. Fly ash aggregate in the gas stream striking the diffuser assembly is dispersed and/or broken into smaller particles for passage through flow channels of the structural catalyst bodies. In some embodiments, the diffuser assembly is arranged over the inlet face of the catalyst layer.

These and other embodiments are described further in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Diffuser Assemblies

As described herein, catalytic assemblies employing diffuser assemblies are provided. In one aspect, a catalytic assembly comprises a module comprising at least one layer of structural catalyst bodies having an inlet face receiving a gas stream. A diffuser assembly is arranged a distance of greater than 50 mm from the inlet face, the diffuser assembly including at least one diffuser element comprising a plurality of apertures, wherein a ratio of aperture length (L) in the gas stream flow direction to aperture hydraulic diameter ($D_a$) is less than 1. Distance from the diffuser assembly to the catalyst inlet face can also have a value selected from Table I.

TABLE I

Distance of Diffuser Assembly to Catalyst Inlet Face

≥75 mm
≥100 mm
≥150 mm
≥175 mm
≥200 mm
100 mm to 1.5 m
125 mm to 1 m
200 mm to 2 m

Figure 1:
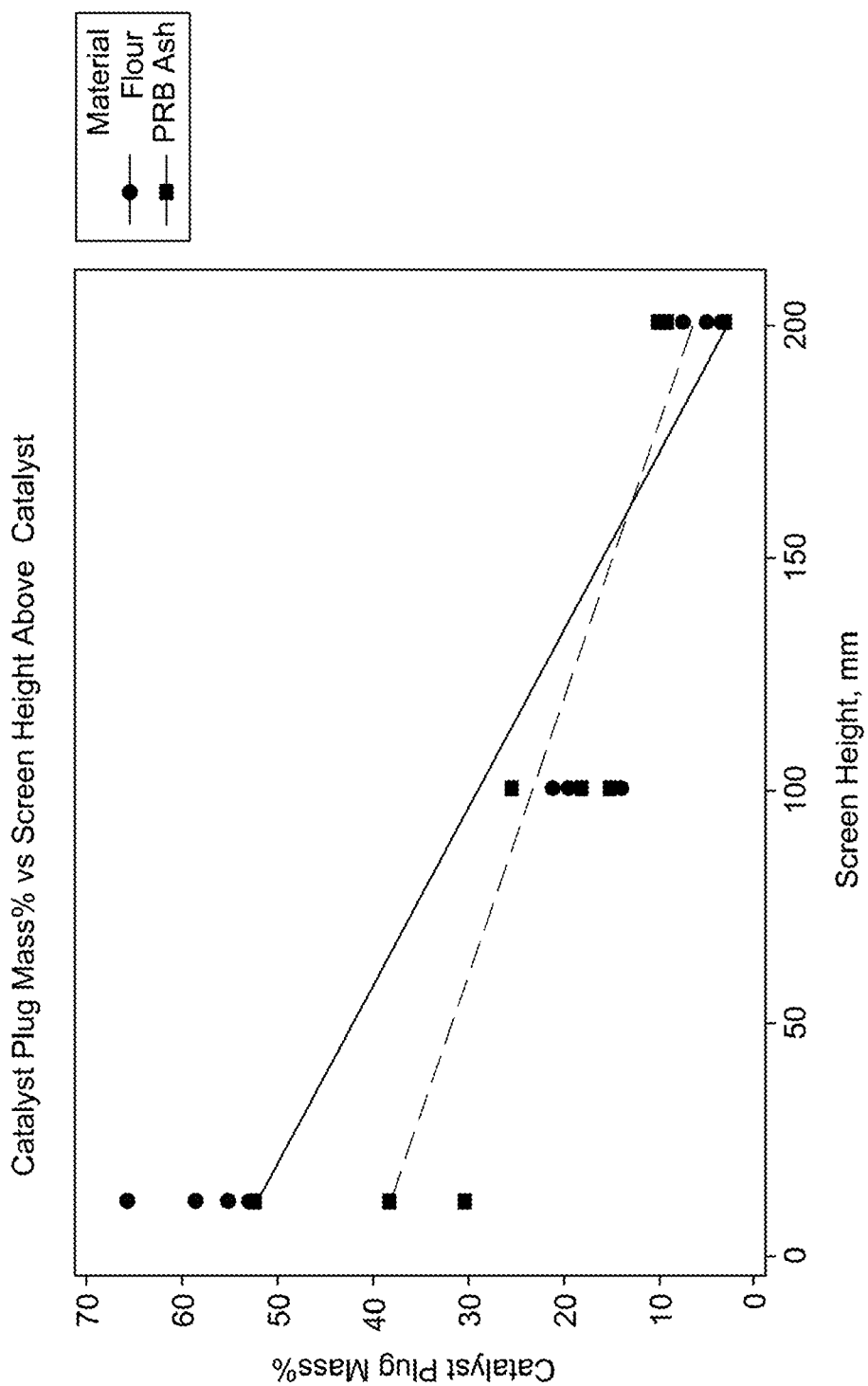
FIG. 1 illustrates catalyst body plugging relative to distance of the diffuser assembly to the inlet face of the catalyst layer according to some embodiments.
Figure 8:
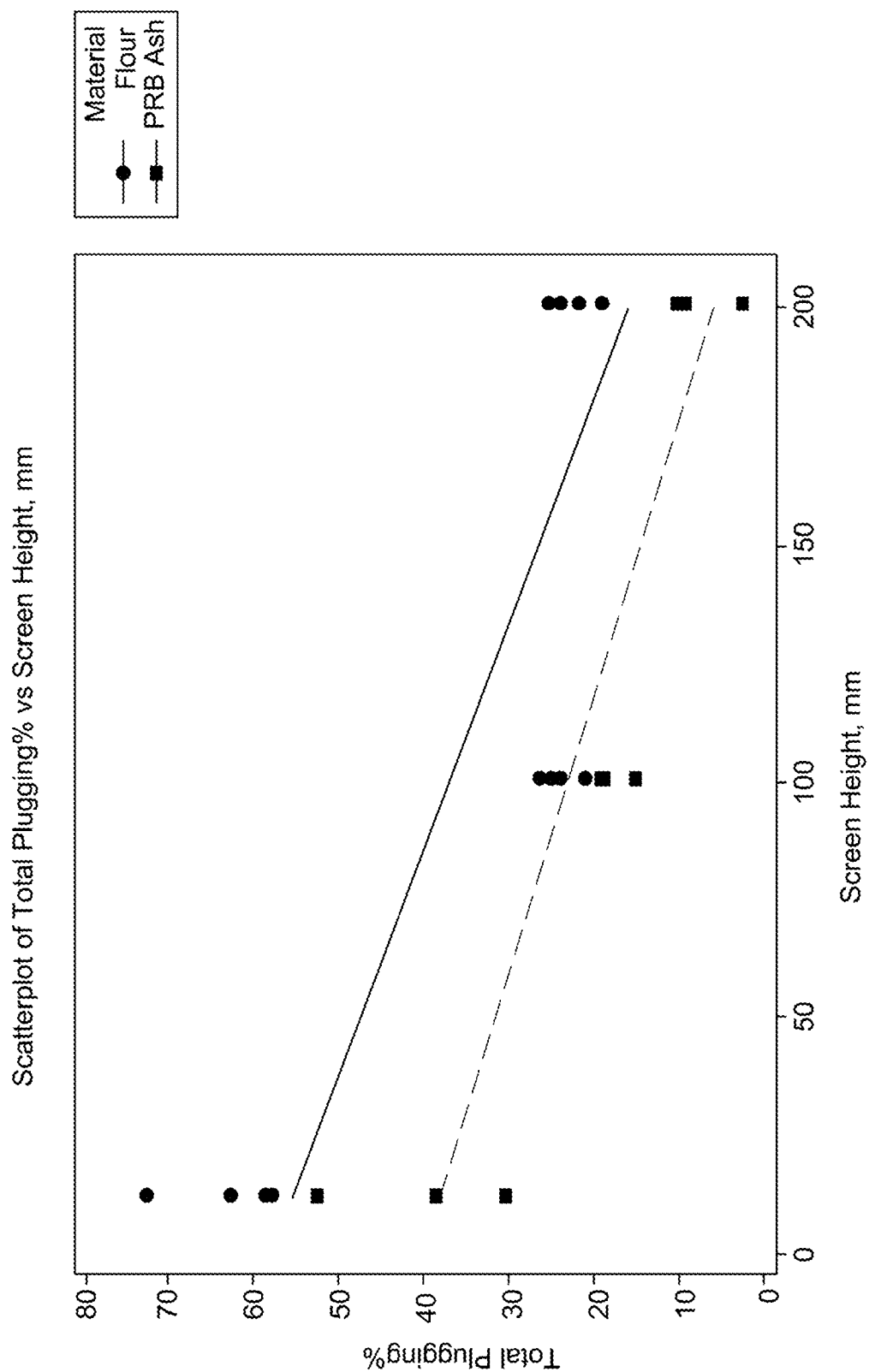
FIG. 8 quantifies catalytic assembly plugging from fly ash aggregates relative to distance of the diffuser assembly to inlet face of the catalyst layer according to some embodiments.

FIG. 1 illustrates catalyst body plugging relative to distance of the diffuser assembly to the catalyst inlet face according to some embodiments. Moreover, FIG. 8 quantifies catalytic assembly plugging from fly ash aggregates relative to distance of the diffuser assembly to inlet face of the catalyst layer according to some embodiments. Notably, FIG. 8 quantifies plugging of the diffuser assembly and catalyst bodies, thereby illustrates that plugging prevention is not due to the diffuser assembly catching and/or collecting the ash. The diffuser assembly can be coupled to the module, in some embodiments. In other embodiments, the diffuser assembly is not coupled to the module.

Figure 2:
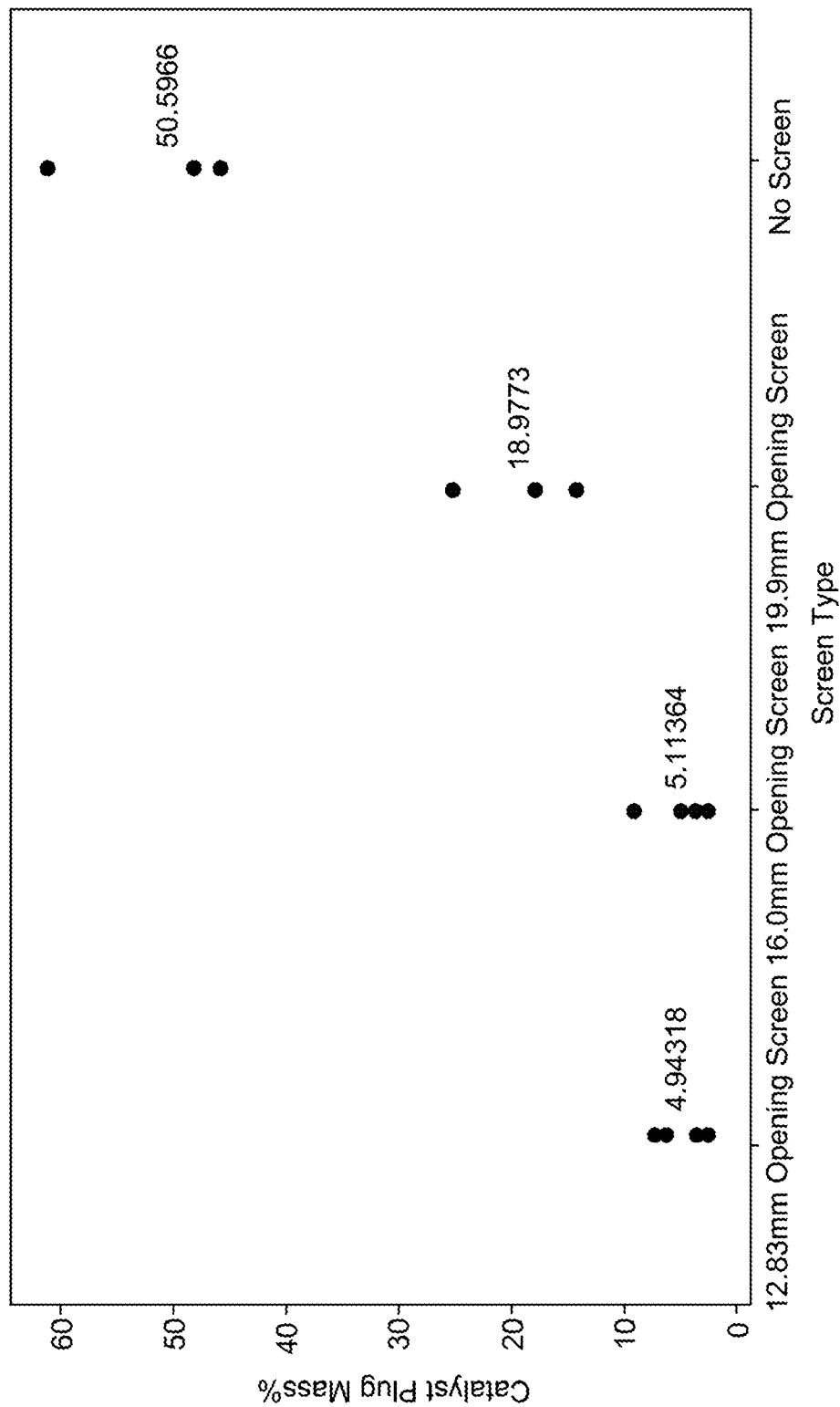
FIG. 2 quantifies catalyst body plugging from fly ash aggregates relative to aperture size according to some embodiments.
Figure 9:
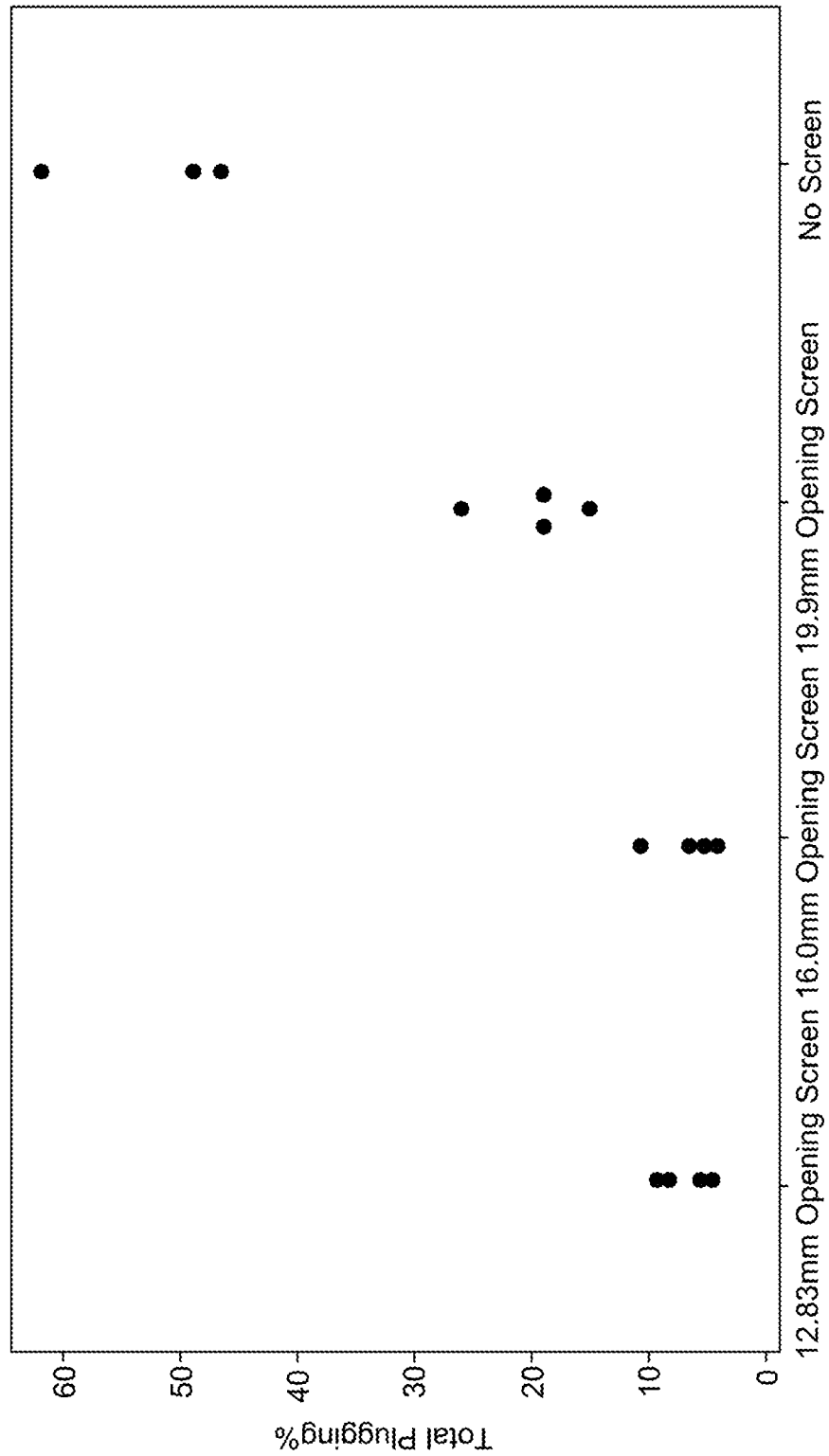
FIG. 9 quantifies catalytic assembly plugging from fly ash aggregates relative to aperture size according to some embodiments.

Turning now to diffuser elements, a diffuser element comprises a plurality of apertures for dispersing and/or breaking-up fly ash aggregates. As described above, apertures of the diffuser element can have a $L/D_a$ ratio of less than 1. In some embodiments, the $L/D_a$ ratio is less than or equal to 0.5. Aperture size or $D_a$ of a diffuser element can also be greater than flow channel hydraulic diameter of the structural catalyst bodies contained in the module, in some embodiments. $D_a$ of a diffuser element, for example, can be 2-3 times greater than flow channel hydraulic diameter. $D_a$ of a diffuser element can also be 1.5 to 5 times greater than flow channel hydraulic diameter of the structural catalyst bodies in the module. In some embodiments, $D_a$ is uniform across the face of a diffuser element. In other embodiments, $D_a$ can vary across the face of a diffuser element. $D_a$, for example, can increase or decrease over the face of a diffuser element according to several considerations including, but not limited to, exhaust stream flow characteristics through the diffuser element and distribution of fly ash aggregates striking the diffuser element. Accordingly, the $L/D_a$ ratio of the aperture can vary over the face of a diffuser element. FIG. 2 quantifies catalyst body plugging from fly ash aggregates relative to aperture size according to some embodiments. FIG. 9 quantifies catalytic assembly plugging from fly ash aggregates relative to aperture size according to some embodiments. In FIG. 9, both plugging of the diffuser assembly and catalyst bodies is quantified.

A diffuser element can have any desired aperture shape. In some embodiments, aperture shape is polygonal including, but not limited to, square, rectangular or hexagonal. In other embodiments, aperture shape is circular or elliptical. Aperture shape can be selected to match flow channel shape of the structural catalyst bodies, in some embodiments. Moreover, aperture shape can be generally uniform over the face of the diffuser element. Alternatively, aperture shape can vary over the diffuser element face. Aperture shape, for example, can change over the face of a diffuser element according to several considerations including, but not limited to, exhaust stream flow characteristics through the diffuser element and distribution of fly ash aggregates striking the diffuser element. In some embodiments, aperture shape is considered in conjunction with aperture size during design of the diffuser element. Additionally, a diffuser element can have any desired open frontal area. A diffuser element, for example, can have an open frontal area of 30-70 percent.

Figure 3:
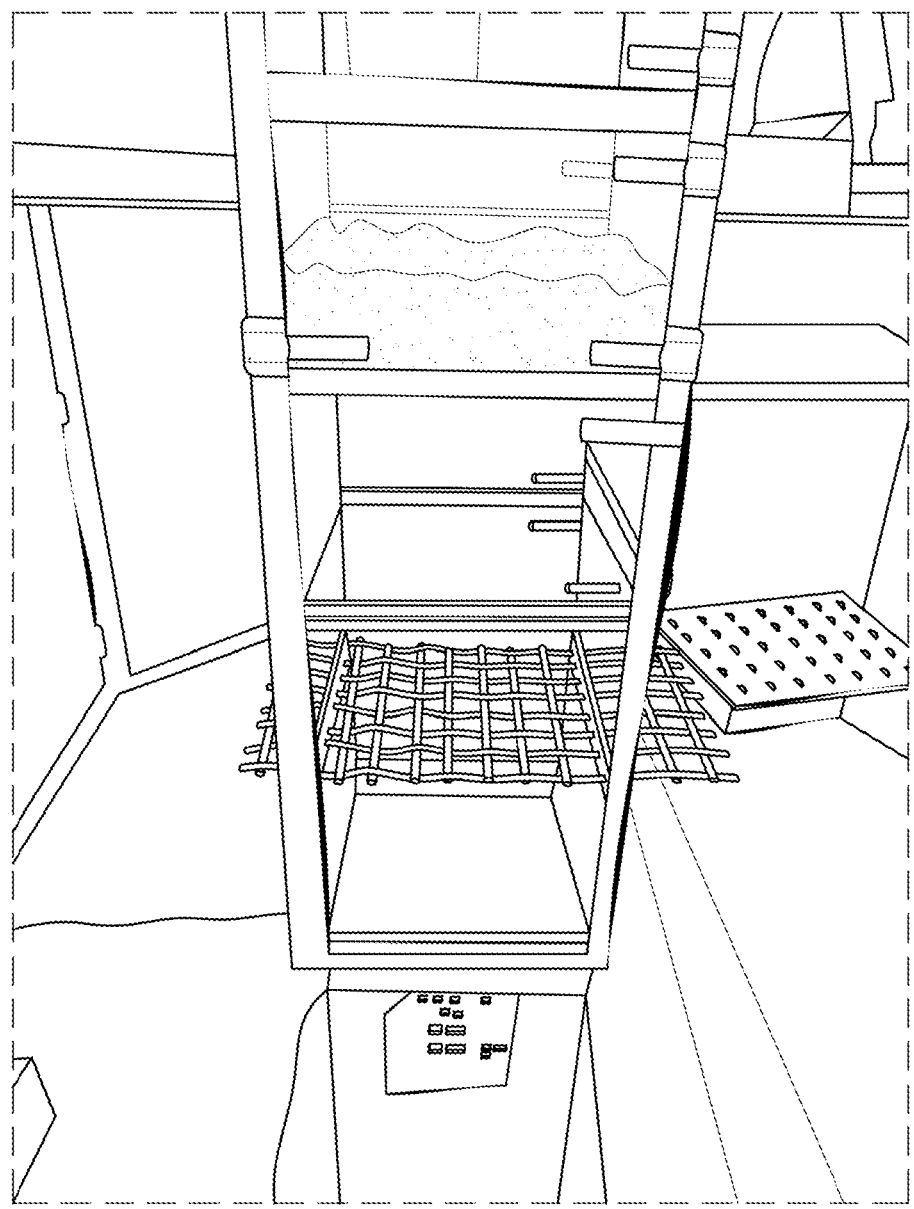
FIG. 3 illustrates a section of a diffuser element arranged over a structural catalyst body according to some embodiments.

Apertures of the diffuser element can generally be formed of intersecting wires or rods. The intersecting wires or rods can have any dimensions and/or cross-sectional geometry. Wire dimensions and cross-sectional geometry, for example, can be selected according to several considerations including, but not limited to, exhaust stream flow characteristics and the ability to disperse or break-up fly ash aggregate for passage of smaller fly-ash particles through the structural catalyst bodies. Wire dimensions and cross-sectional geometry can also be selected to preclude or minimize fly ash accumulation on the diffuser element. In some embodiments, wires or rods have circular or elliptical cross-sectional geometry. In other embodiments, wires or rods forming the apertures exhibit polygonal cross-sectional geometry including, but not limited to, triangular, square, rectangular, diamond or hexagonal. When exhibiting a polygonal cross-sectional geometry, the wires or rods can be oriented such that a vertex of the polygon faces one or more directions of fly ash aggregate impingement on the diffuser element. In this way, the fly ash aggregate can be spread by faces of the polygon forming the vertex. FIG. 3 illustrates a section of a diffuser element arranged over a structural catalyst body according to some embodiments. The diffuser element comprises a plurality of square apertures of size greater than flow channel hydraulic diameter of the structural catalyst body. A volume of fly ash is positioned above the diffuser element for simulating fly ash aggregate falling from reactor ductwork or beams near the inlet face of the catalyst layer. In some embodiments, wires or rods forming the apertures can comprise a coating affecting tribological properties of the wires. Coatings can be wear resistant and/or reduce friction forces experienced at surfaces of the wires. In some embodiments, a coating comprises one or more elements selected from the group consisting of aluminum and metallic elements of Groups IVB, VB and VIB of the Periodic Table and one or more non-metallic elements of Groups IIIA, IVA, VA and VIA of the Periodic Table. In other embodiments, the coating can comprise graphite or diamond-like carbon (DLC). Coatings can be deposited by chemical vapor deposition (CVD), physical vapor deposition (PVD) or combinations thereof.

Figure 5:
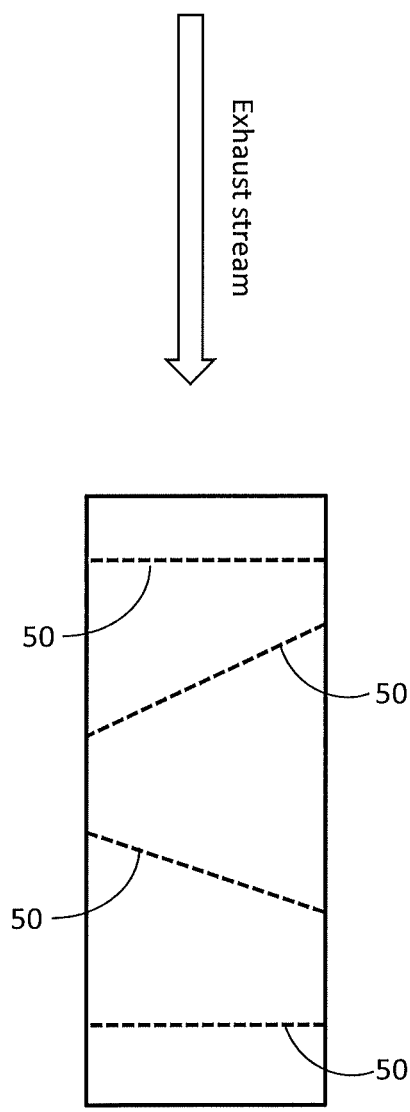
FIG. 5 illustrates various angular orientations of diffuser elements relative to exhaust stream flow according to one embodiment.
Figure 6:
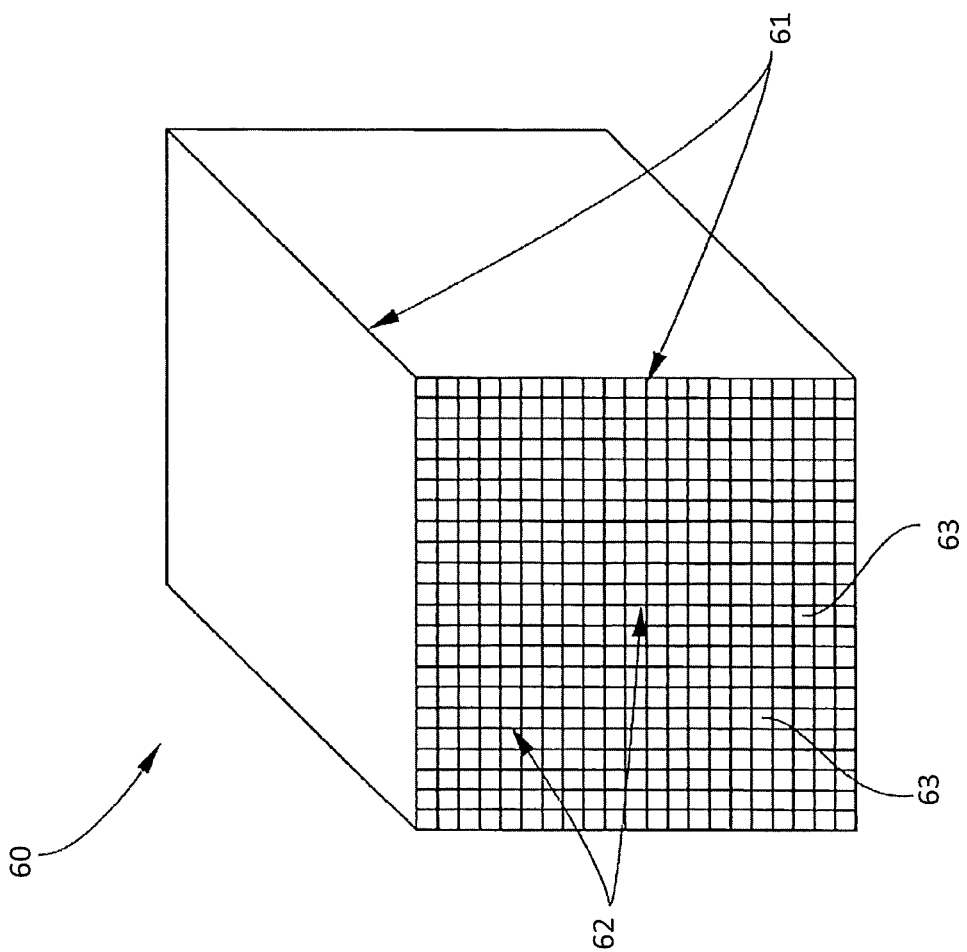
FIG. 6 illustrates a honeycomb-like structural catalyst body according to one embodiment described herein.

A diffuser assembly, in some embodiments, comprises a plurality of diffuser elements. A diffuser assembly, for example, can comprise a plurality of vertically integrated diffuser elements. In being vertically integrated, individual diffuser elements partially or completely overlap one another such that the exhaust stream flows through the individual elements in a sequential or serial manner. Accordingly vertical integration covers any arrangement or orientation where diffuser elements partially or completely overlap and encounter the exhaust gas stream and fly ash aggregates in a sequential or serial manner. Depending on the design of the catalytic reactor and exhaust stream flow path, the vertically integrated diffuser elements may extend in a vertical dimension. In other embodiments, the vertically integrated diffuser elements may extend in a horizontal direction, as illustrated in the embodiment of FIG. 5.

In some embodiments, the vertically integrated diffuser elements generally exhibit the same properties and/or construction. The diffuser elements, for instance, can have the same aperture size, shape and/or $L/D_a$ ratio. Alternatively, the vertically integrated diffuser elements can vary in one or more properties. Aperture size, shape and/or $L/D_a$ ratio can vary between the diffuser elements. In some embodiments, aperture size or $D_a$ increases in a direction moving away from the catalyst layer inlet face. In other embodiments, aperture size or $D_a$ can decrease in a direction moving away from the catalyst inlet face. Open frontal area can also vary between diffuser elements of the vertical integration.

Figure 4:
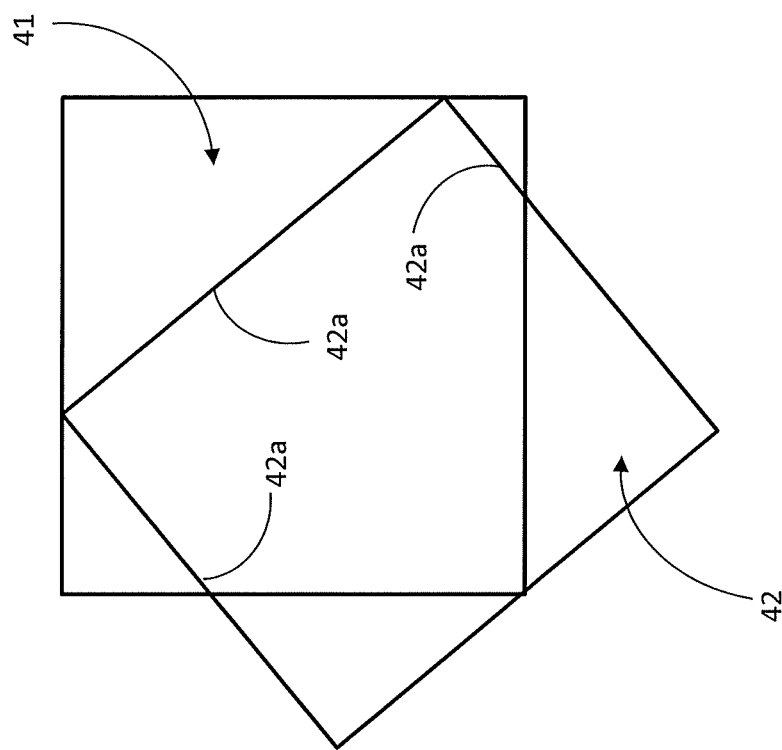
FIG. 4 illustrates radial offset between apertures of two diffuser elements according to some embodiments.
Figure 7:
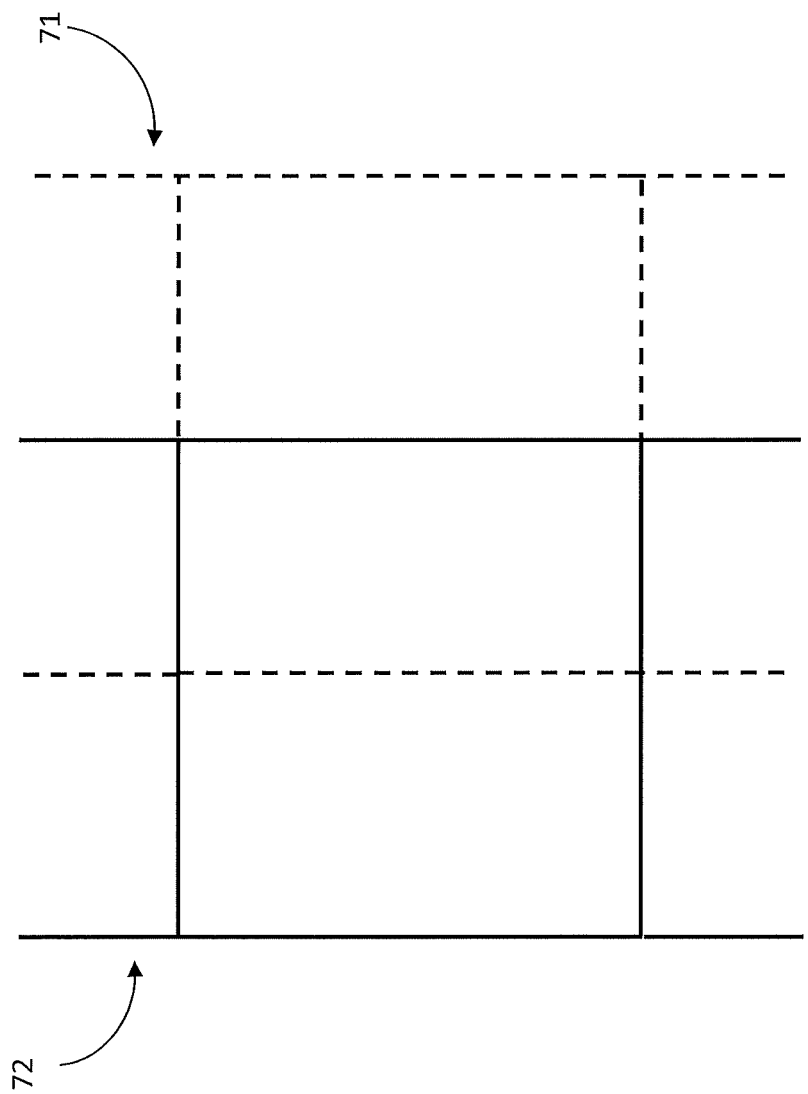
FIG. 7 illustrates lateral offset between apertures of two diffuser elements according to some embodiments.

Additionally, apertures of two or more diffuser elements in the vertical integration can be radially offset and/or laterally offset. In some embodiments, for example, apertures of two or more diffuser elements are radially offset by 45-90 degrees. Any radial offset and/or lateral offset can be employed in the vertical integration. Radial offset between diffuser elements can enhance dispersion and/or break-up of fly ash aggregates. Fly ash passing through apertures of a first diffuser element will strike wires of subsequent diffuser element(s) due to the radial offset. FIG. 4 illustrates radial offset between apertures of two diffuser elements according to some embodiments. As illustrated in FIG. 4, the aperture 42 of the second diffuser element is radially offset from the first aperture 41 by 45°. Therefore, fly ash passing through the first aperture 41 can strike the wires 42a of the second aperture 42, thereby resulting in dispersion or break-up. FIG. 7 illustrates lateral offset between apertures of two vertically integrated diffuser elements according to some embodiments. Diffuser element 71 is offset from diffuser element 72 in the lateral direction. Diffuser element 71 is represented by dashed lines to further illustrate the lateral offset. Radial offset and/or lateral offset can be used in a section or throughout the vertically integrated diffuser elements.

Diffuser element(s) are generally oriented normal to the exhaust stream flowing through the catalytic assembly. In some embodiments, however, a diffuser element can exhibit a non-normal arrangement relative to exhaust stream flow. The face of a diffuser element, for example, can form an acute or obtuse angle with the axis of exhaust stream flow. In some embodiments, vertically integrated diffuser elements can exhibit various angular orientations relative to exhaust stream flow. FIG. 5 illustrates various angular orientations of diffuser elements 50 relative to exhaust stream flow according to one embodiment. Moreover, vertically integrated diffuser elements can have any desired spacing in the diffuser assembly. In some embodiments, diffuser elements have a spacing of at least 50 mm. Spacing between diffuser elements can also be uniform or non-uniform.

Notably, angular orientation, aperture size, aperture shape, vertical integration and radial offset of diffuser elements can be individually selected or selected in conjunction with one another to provide desired dispersion and/or break-up of fly ash aggregates to mitigate structural catalyst body plugging.

When arranged in a catalytic reactor, the diffuser assembly can be at least 100 mm from one or more upstream components of the catalytic reactor. Upstream components can have an area greater than 10 percent of the surface area of a diffuser element face. In some embodiments, the diffuser assembly is at least 200 mm from one or more upstream components. Upstream components can be sources of ash accumulation or aggregation. For example, gas stream flow control vanes and/or other flow control apparatus are upstream components prone to ash accumulation.

Structural catalyst bodies for use in modules described herein comprise a fluid stream inlet face, a fluid stream outlet face and flow channels defined by inner partition walls extending from the inlet face to the outlet face. Structural catalyst bodies can exhibit various flow channel constructions. For example, a structural catalyst body can have a honeycomb design comprising an outer peripheral wall and a plurality of inner partition walls arranged within the outer peripheral wall. FIG. 6 illustrates a honeycomb-like structural catalyst body according to one embodiment described herein. The structural catalyst body 60 of FIG. 6 comprises an outer peripheral wall 61 and a plurality of inner partition walls 62. The inner partition walls 62 define a plurality of flow channels or cells 63 which extend longitudinally through the honeycomb-like structural catalyst body 60. The inner partition walls 62 and their junctures with the outer peripheral wall 61 serve as boundaries of adjacent flow channels 63. As the cross-sectional profile of flow channels 63 of the honeycomb-like structural catalyst body illustrated in FIG. 6 is square, the inner partition walls 62 have equal or substantially equal widths.

Cross-sectional profiles of flow channels can also be nominally polygonal such as triangular, square, rectangular or hexagonal. In some embodiments, cross-sectional profiles of flow channels can be round or oval or combinations with polygonal and curved shapes such as annular sectors. Moreover, the cross-sectional profile of the outer perimeter of the outer peripheral wall of the catalytic body can be square, rectangular, round, oval, circular sectors such as pie slices or quadrants, or any other geometric shape or shapes convenient for a given application.

Additionally, structural catalyst bodies can be formed of any desired composition. Composition of the structural catalyst bodies can be chosen according to several factors including catalytic reaction(s) of interest, catalytic surface area and size requirements of the structural catalyst body. Structural catalyst bodies can exhibit single-functional or multi-functional catalytic activity.

In some embodiments, the structural catalyst bodies are suitable for the selective catalytic reduction of nitrogen oxides. In such embodiments, the catalyst bodies can be formed of a chemical composition comprising 50-99.9% by weight an inorganic oxide composition and at least 0.1% by weight a catalytically active metal functional group. The inorganic oxide composition can include, but is not limited to, titania ($TiO_2$), alumina ($Al_2O_3$), zirconia ($ZrO_2$), and/or mixtures thereof. Moreover, in some embodiments, the catalytically active metal functional group includes, but is not limited to, gold, platinum, iridium, palladium osmium, rhodium, rhenium, ruthenium, vanadium pentoxide ($V_2O_5$), tungsten oxide ($WO_3$), molybdenum oxide ($MoO_3$) or other noble metals or mixtures thereof. In further embodiments, the chemical composition can comprise up to 30% by weight other oxides such as silicon dioxide ($SiO_2$), reinforcement agents such as glass fibers and/or extrusion aids. Further, the chemical composition can be substantially uniform.

In some embodiments, structural catalyst bodies for use in modules described herein have a construction as described in any one of U.S. Pat. Nos. 7,776,786, 7,807,110, 7,833,932 and 7,390,471, each of which is incorporated herein by reference in its entirety. Additionally, a structural catalyst body can have a construction as described in United States Patent Application Publication 2012/0087835, which is incorporated herein by reference in its entirety.

II. Methods of Reducing Catalyst Plugging

In another aspect, methods of reducing plugging of structural catalyst bodies are provided. A method of reducing plugging of structural catalyst bodies in a catalytic reactor comprises providing a diffuser assembly comprising at least one diffuser element including a plurality of apertures having a ratio of aperture length (L) in the gas stream flow direction to aperture hydraulic diameter ($D_a$) less than 1. The diffuser assembly is arranged in the gas stream path at a distance of greater than 50 mm to an inlet face of a layer of structural catalyst bodies in a module. Fly ash aggregate in the gas stream striking the diffuser assembly is dispersed and/or broken into smaller particles for passage through flow channels of the structural catalyst bodies. In some embodiments, the diffuser assembly is arranged directly over the inlet face of the catalyst layer.

In a further aspect, a method of reducing plugging of structural catalyst bodies in a catalytic reactor comprises providing a diffuser assembly comprising vertically integrated diffuser elements, the diffuser elements comprising a plurality of apertures having a ratio of aperture length (L) in the gas stream flow direction to aperture hydraulic diameter ($D_a$) less than 1, wherein aperture the hydraulic diameter ($D_a$) varies between the vertically integrated diffuser elements. The diffuser assembly is arranged in the gas stream path to an inlet face of a layer of structural catalyst bodies. Fly ash aggregate in the gas stream striking the diffuser assembly is dispersed and/or broken into smaller particles for passage through flow channels of the structural catalyst bodies. In some embodiments, the diffuser assembly is arranged over the inlet face of the catalyst layer.

In some embodiments, the fly ash aggregate falls a distance of 1 to 10 feet prior to striking the diffuser assembly. Moreover, the diffuser assembly can have any structure and/or properties recited in Section I above.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A catalytic assembly comprising:
   a module comprising at least one layer of structural catalyst bodies, the layer having an inlet face for receiving a gas stream; and
   a diffuser assembly arranged a distance of greater than 50 mm from the inlet face, the diffuser assembly including a plurality of diffuser elements vertically integrated in the diffuser assembly, the diffuser elements comprising a plurality of apertures, the apertures of two or more diffuser elements being radially offset and/or laterally offset,
   wherein a ratio of aperture length (L) in the gas stream flow direction to aperture hydraulic diameter ($D_a$) is less than 1.

2. The catalytic assembly of claim 1, wherein the distance from the diffuser assembly to the inlet face is at least 75 mm.

3. The catalytic assembly of claim 1, wherein the distance from the diffuser assembly to the inlet face is at least 100 mm.

4. The catalytic assembly of claim 1, wherein the distance from the diffuser assembly to the inlet face is 75-200 mm.

5. The catalytic assembly of claim 1, wherein $L/D_a<0.5$.

6. The catalytic assembly of claim 1, wherein the aperture hydraulic diameter ($D_a$) is greater than flow channel hydraulic diameter of the structural catalyst bodies.

7. The catalytic assembly of claim 1, wherein the aperture hydraulic diameter ($D_a$) is greater than 7 mm.

8. The catalytic assembly of claim 1, wherein the aperture hydraulic diameter ($D_a$) is greater than 9 mm.

9. The catalytic assembly of claim 1, the apertures are polygonal.

10. The catalytic assembly of claim 1, wherein the apertures are circular or elliptical.

11. The catalytic assembly of claim 1, wherein the aperture hydraulic diameter ($D_a$) is uniform.

12. The catalytic assembly of claim 1, wherein the aperture hydraulic diameter ($D_a$) varies over the diffuser element face.

13. The catalytic assembly of claim 1, wherein the apertures of the diffuser element are formed by intersecting wires.

14. The catalytic assembly of claim 13, wherein the wires have circular or elliptical cross-sectional geometry.

15. The catalytic assembly of claim 13, wherein the wires have polygonal cross-sectional geometry.

16. The catalytic assembly of claim 1, wherein the diffuser element has an open frontal area of 30-70 percent.

17. The catalytic assembly of claim 1, wherein the apertures are radially offset by 5-90 degrees.

18. The catalytic assembly of claim 1, wherein aperture hydraulic diameter ($D_a$) is uniform between the vertically integrated diffuser elements.

19. A catalytic assembly comprising:
   a module comprising at least one layer of structural catalyst bodies, the layer having an inlet face for receiving a gas stream; and a diffuser assembly arranged a distance of greater than 50 mm from the inlet face, the diffuser assembly including a plurality of diffuser elements vertically integrated in the diffuser assembly, the diffuser elements comprising a plurality of apertures, wherein a ratio of aperture length (L) in the gas stream flow direction to aperture hydraulic diameter ($D_a$) is less than 1 and aperture hydraulic diameter ($D_a$) varies between the vertically integrated diffuser elements.

* * * * *